United States Patent [19]
Carleton

[11] Patent Number: 6,116,401
[45] Date of Patent: *Sep. 12, 2000

[54] APPARATUS FOR ROTATING ARTICLES

[75] Inventor: Nicholas D. Carleton, Langhorne, Pa.

[73] Assignee: Carleton, Inc., Langhorne, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,781

[22] Filed: Apr. 29, 1997

[51] Int. Cl.[7] .................................................. B65G 47/24
[52] U.S. Cl. ............................................................. 193/46
[58] Field of Search ............................... 193/46; 198/417

[56] References Cited

U.S. PATENT DOCUMENTS

| | | | |
|---|---|---|---|
| 2,400,419 | 5/1946 | Hohl et al. | 193/46 |
| 2,564,143 | 8/1951 | Alsup | 193/46 |
| 2,905,295 | 9/1959 | Anderson | 193/46 |
| 3,797,641 | 3/1974 | Nelson et al. | 193/46 |
| 4,136,765 | 1/1979 | Abraham et al. | 193/46 |
| 4,458,801 | 7/1984 | Nichols | 193/46 |
| 4,492,299 | 1/1985 | McLeod | 193/46 |
| 4,998,911 | 3/1991 | Reeves, Jr. et al. | 193/46 |

FOREIGN PATENT DOCUMENTS

| | | | |
|---|---|---|---|
| 211214 | 9/1986 | Japan | 193/46 |
| 406009028 | 1/1994 | Japan | 193/46 |
| 8901470 | 1/1991 | Netherlands | 193/46 |
| 336053 | 3/1959 | Switzerland | 198/417 |
| 1127845 | 9/1968 | United Kingdom | 198/417 |

*Primary Examiner*—Christopher P. Ellis
*Assistant Examiner*—Khoi H. Tran
*Attorney, Agent, or Firm*—John P. Blasko; Douglas J. Ryder; J. P. Blasko P.C.

[57] ABSTRACT

A static article-rotating apparatus having a continuous helical channel designed within a tubular member is disclosed. One or more guides smoothly and continuously deflect an article as it passes through the channel thereby rotating the article.

24 Claims, 6 Drawing Sheets

APPARATUS FOR ROTATING ARTICLES

FIELD OF THE INVENTION

This invention relates generally to apparatus used in the packaging industry, and more particularly to a static article-rotating apparatus.

BACKGROUND OF THE INVENTION

Many manufacturing and packaging procedures require that an article, or a series of articles, be rotated or turned to change the physical orientation of the article. For example, an upright box that has exited one step of a packaging procedure, may need to be placed on its side before entering the next step of the procedure.

A number of electrically-powered devices that rotate an article exist. However, these devices have several drawbacks, including complexity, cost of operating and maintaining, and an inability to accommodate changes in the packaging line.

Static or non-electrically powered turning devices are also known in the art. One static article-turning device utilizes a plurality of winding parallel rails which define a path; an article is turned as the article traverses the path. A draw back of this rail-type device is that the rails are typically fabricated from metal and must be aligned with some precision, otherwise the article will jam or fall out from between the rails.

A second type of static article-turning device is taught by U.S. Pat. No. 4,492,299 to McLeod. The '299 patent discloses a device comprising a plurality of cards; each card having an aperture in the general shape of the article to be turned. The cards are placed in succession such that the aperture of each card is slightly skewed from the aperture of the card directly preceding it. In this manner, the cards form a path and the article is incrementally turned by the cards (i.e., by the amount of the skew of each aperture) as the article proceeds along the path. A drawback of this type of prior article-turning device is that the cards must be cut and aligned with some precision; also, the incremental change in the path made by each card tends to grab the corners of boxes causing blockage.

SUMMARY OF THE INVENTION

The subject invention is an apparatus for rotating an article and comprises a tubularly-shaped member, and means for defining a channel through the tubularly-shaped member and for rotating said article as the article traverses the length of the channel.

The means for defining and for rotating generally consists of one or more guides attached to the interior surface of the tubularly-shaped member. The guides have smooth surfaces that define a continuous, generally helically-shaped channel.

In one embodiment, two helically-shaped guides are positioned diametric to each other within the tubular member, thereby forming a double helix arrangement. The guides usually communicate with at least a portion of the interior surface of the tubularly-shaped member in order to engage and rotate an article.

The subject article-turning apparatus may also include a conveyor belt or other positive pressure means for delivering a series of articles to a first end of said tubularly-shaped member. The conveyor belt supplies sufficient force to succeeding articles of the series to move the preceding articles through the channel until each article exits the tube at a second end.

The subject invention includes also a process of manufacturing a static article-turning apparatus. The method comprises the steps of providing a tube, and providing a cylindrically-shaped member having an outer diameter slightly less than the inner diameter of said tube. A helically-shaped slot is then machined through the cylindrically-shaped member along the diameter of the cylindrically-shaped member.

In a preferred manufacturing method, a standard milling bit is used to machine a continuous slot along the diameter of the cylindrical member. The degree of rotation required to be imparted to the article directly depends on the rate of longitudinal movement of the bit with respect to the rate of rotation of the cylindrical member during the machining step of the manufacturing process.

The machined cylindrically-shaped member is then positioned within the tube and is affixed to the interior of the tube. The next step is to cut off the ends of the machined cylinder and tube leaving a channel through the longitudinal dimension of the tube.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENT

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 10 in particular, the apparatus of the present invention is disclosed and generally indicated as 11.

Figure 1:
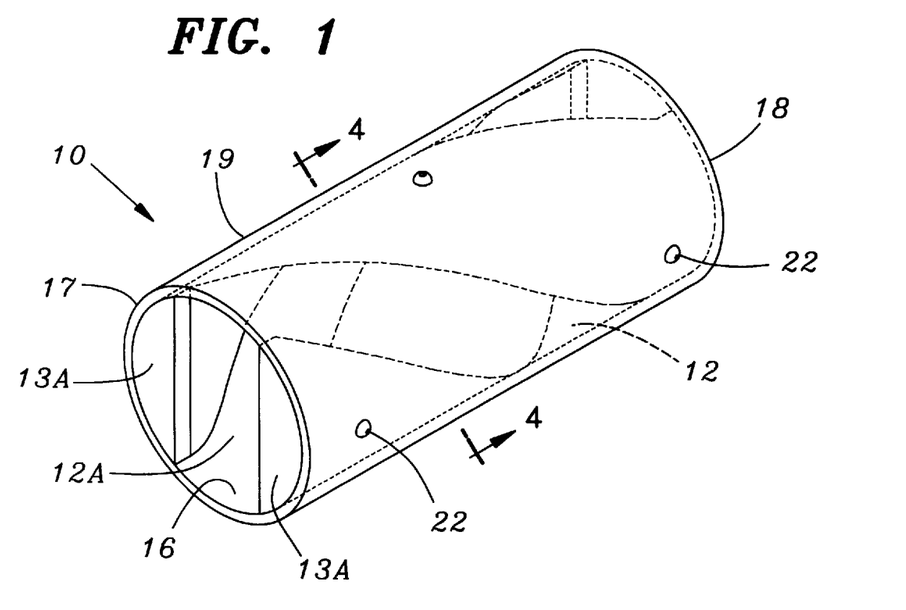
FIG. 1 is a perspective view of an article-rotating apparatus in accordance with the present invention.
Figure 2:
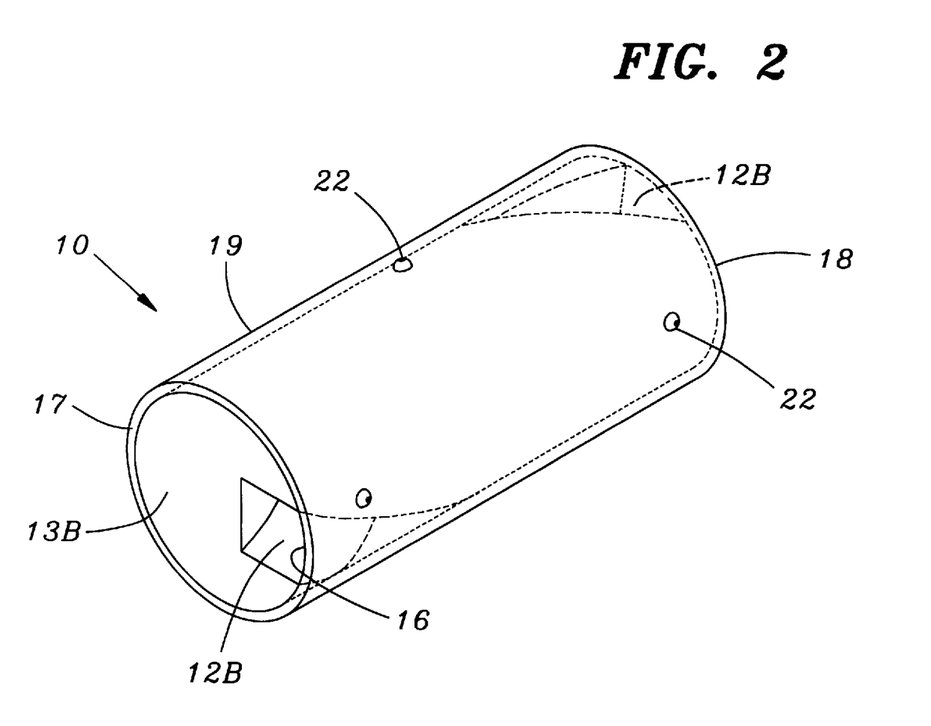
FIG. 2 is a perspective view of a second embodiment of an article-turning apparatus according to the present invention.

As shown in FIGS. 1 and 2, the static article-turning apparatus 10 comprises a tubularly-shaped member 19, and a guide or guides (generally referred to as 13) that define a helically-shaped channel 12 through the longitudinal dimension of the tubular member 19. The guide or guides 13 are affixed to the interior of the tubular member 19.

The preferred means of affixing the guides 13 is by screwing screws 22 through the tubularly-shaped member 19 and into the rear side of the guides 13. The screws 22 should not pass completely through the guides; otherwise they may interfere with the passage of the article through channel 12. Other means may be used to attach the guides 13 to the interior 16 of the tubularly-shaped member 19, including adhesives such as epoxy and the like.

In the preferred embodiment, the rear or outer surface of the guides 13 is generally convex in shape in order to matingly engage the inner concave surface 16 of the tubularly-shaped member 19.

Each guide 13 is preferably made of a single piece of plastic, thereby ensuring a continuous and smooth surface for defining the channel 12. The continuous surfaces permit the article to smoothly rotate as it traverses the channel, reducing the probability that the article will jam within the channel. FIGS. 1 through 10 illustrate guides made out of a solid cylindrical member in which the channel engaging the article is milled in the solid cylinder. However, as shown in FIG. 11, a hollow cylinder or tube may be used to make guides 13C providing a channel 12C having top portion 14 and bottom portion 15 for engaging the top and bottom portions of the article to be turned. This apparatus may be constructed from an outer tube 19 and an inner tube in the same manner as a solid cylinder as described in greater detail below.

The plastics used to manufacture the guides 13 may be chosen to decrease the friction between the guides and the rotating articles, also reducing the likelihood of the article jamming in the channel. In the preferred embodiment the guides 13 are made of a high molecular weight polyethylene, e.g., ultra high molecular weight polyethylene (UHMWPE) or polytetrafluoroethylene (PTFE). One skilled in the art will recognize that any suitable low friction material may be used.

The tubular member 19 is also made of plastic. However, since the interior surface of the tubular member does not, or only briefly, engages the article as it rotates, a less expensive plastic may be used to manufacture the tubular member 19 without worry of increasing the friction as the article traverses the channel 12. It is desirable for tubular member 19 to be fabricated from a transparent or semitransparent plastic such as an acrylic plastic. Transparent tubes permit the user to view the articles as they are being turned within the apparatus. Acrylic tubes are generally available at a variety of diameters.

In a preferred embodiment shown in FIG. 1, two guides 13A are used to define the channel 12A. Each guide 13A is helically-shaped. The guides 13A are diametrically opposed from each other, thereby forming a double helix. The guides 13A communicate with each other—and occasionally with a portion of the interior surface 16 of the tubularly-shaped member 19—to define a channel 12A through the tubularly-shaped member. As indicated previously, the helically-shaped guides 13A generally define a helically-shaped channel 12A along the longitudinal dimension of tubularly-shaped member 19.

Although an article-rotating apparatus, similar to the embodiment shown in FIG. 1, can be manufactured for small articles by reducing the diameter of tubular member 19 and correspondingly reducing the size of the guides 13A, it may be desirable to standardize certain elements. Standardization of elements would result in a reduction of inventory, material costs and machining costs. For example, instead of purchasing a variety of tubular members having different diameters, it may be desirable to purchase tubular members of only one diameter (i.e., a "standard" diameter).

Figure 10:
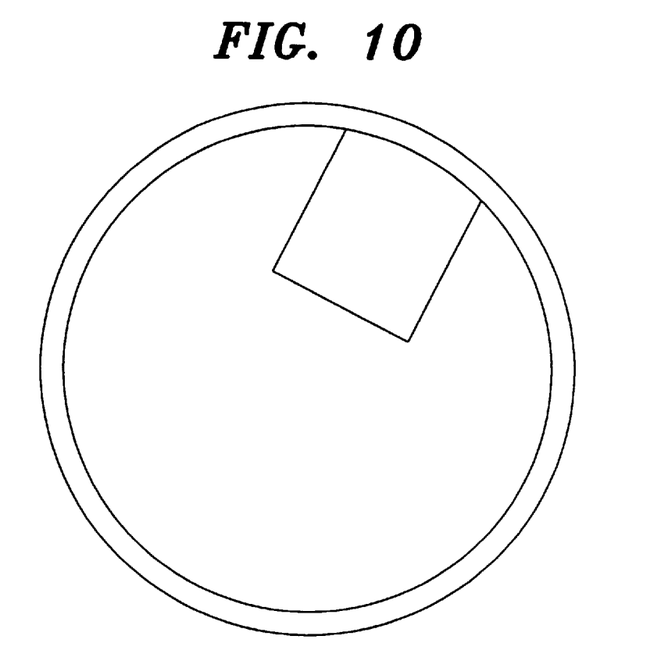
FIG. 10 is a front end plan view of the article-rotating apparatus shown in FIG. 2.
Figure 11:
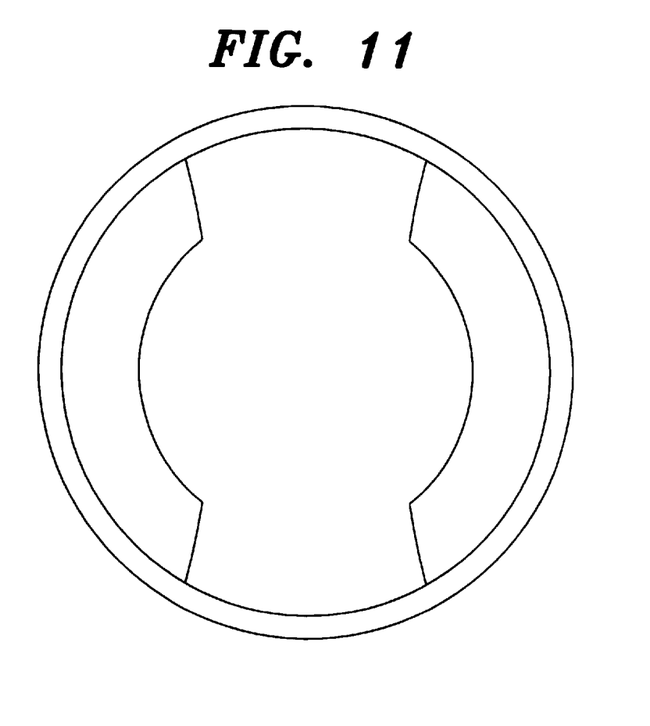
FIG. 11 is a front end plan view of the article-rotating apparatus illustrating the use of a hollow cylindrical core member positioned within the tubularly-shaped outer casing.

An embodiment of the present invention shown in FIGS. 2 and 10 may be used to rotate relatively small articles in a product line while using a "standard" diameter tubular member. A single guide 13B, having a surface slot 26 machined into its periphery, is positioned inside the tubular member 19. The guide 13B communicates with a portion of the interior surface 16 of the tubular member 19 to define a helically-shaped channel 12B through the longitudinal dimension of the tubular member 19. The dimensions of the channel 12B should be on the order of magnitude of the article to be rotated.

Figure 3:
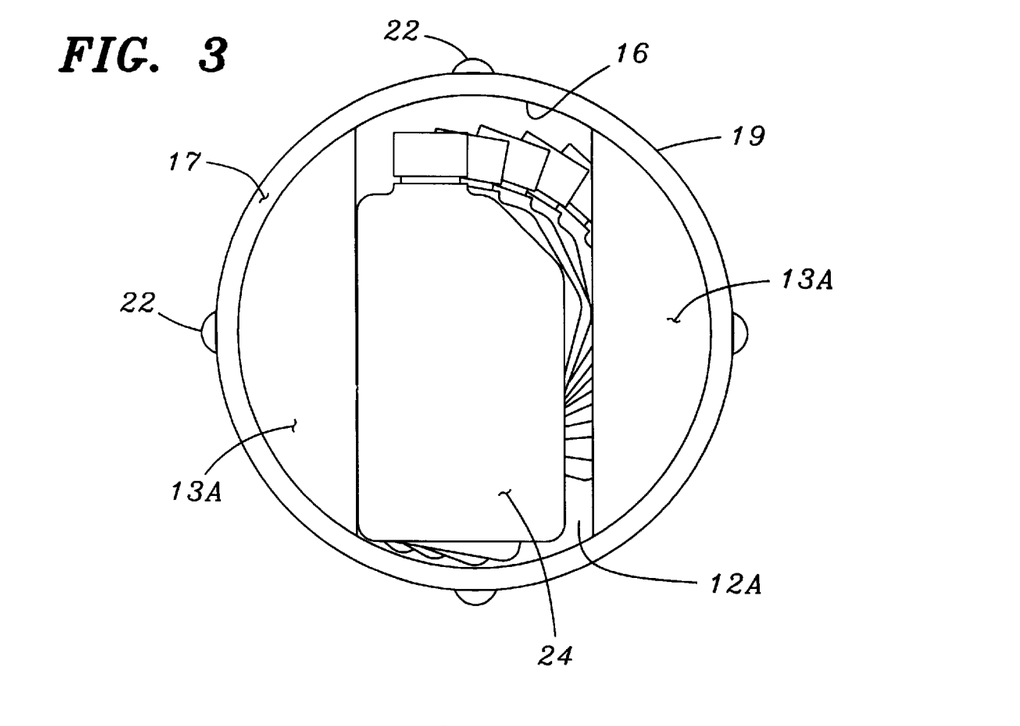
FIG. 3 is a front end plan view of the article-rotating apparatus shown in FIG. 1 with a bottle placed at the beginning or first end of the channel.

The operation of the subject article-turning apparatus will be described below. In a procedure for packaging, an article may have to be oriented in a number of positions. As illustrated in FIG. 3, an article (in this example the article is a non-symmetrical motor oil bottle 24) is delivered to a first end 17 of the tubular member 19. The article may be delivered to the article-rotating apparatus 10 in its normal or "sitting" orientation, with its cap positioned at the top, as shown. As one skilled in the art can appreciate, the subject invention can be manipulated to suit any orientation of the article during the packaging procedure. Moreover, any degree of rotation can be imparted to the article by designing the appropriate parameters of the subject article-rotating apparatus 10.

The means for delivering the article to the first end of the tubular member may be a conveyor belt (not shown) or other article-moving device used in the packaging industry. Normally, a packaging procedure handles a continuous stream or a series of articles. Each article in the series has the same orientation as it is delivered to the first end of the subject invention. Each article is then fed into the first end 17 of the subject article-rotating apparatus 10 and pushed through the channel 12 by the succeeding articles in the series.

The conveyor belt imparts sufficient force on the articles entering the first end 17 to push the preceding articles completely through the channel 12B and eventually out of the second end 18 of the tubular member 19. Other means may be used to force the articles through the channel (e.g., gravity, drive belts, positive star wheels or air pressure), or a combination of means may be employed. As the article exits the second end 18 of the tubular member 19, it has rotated the desired number of degrees since it was continuously engaged and deflected by the guides 13.

Figure 4:
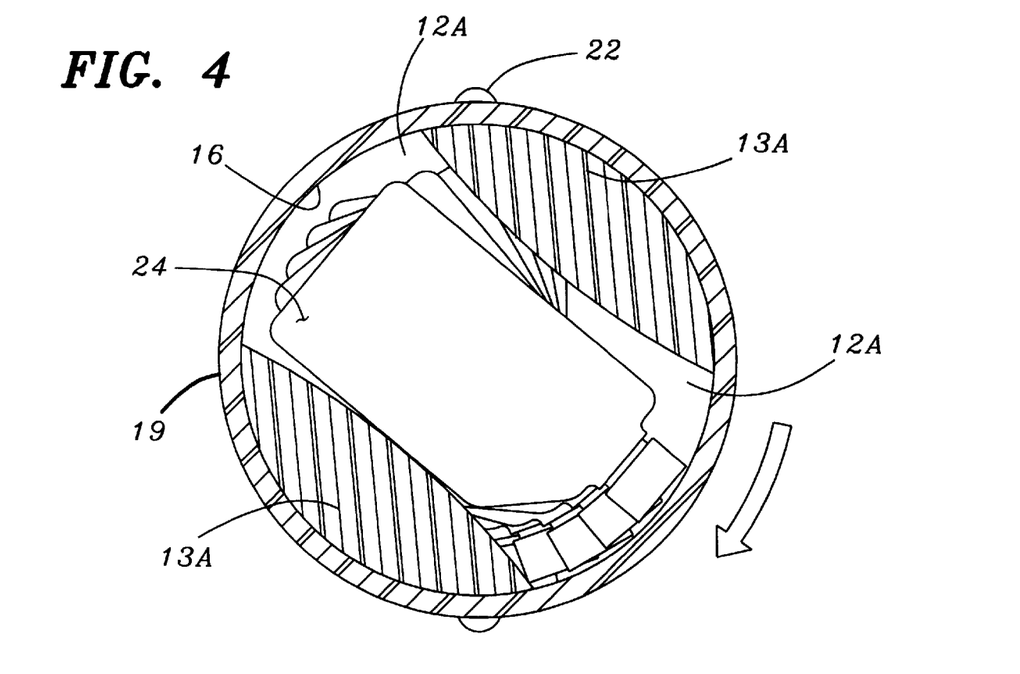
FIG. 4 is a cross-sectional view of the article-rotating apparatus shown in FIG. 1 taken along line 4—4 and including the bottle.

As seen in FIGS. 3 and 4, the channel has a generally rectangular cross-section at its ends. This is an important feature since the cross-section of the channel does not have to resemble the article passing therethrough. Accordingly, the same article-rotating apparatus 10 can be used for more than one product line, and edges on the guides are eliminated thereby reducing the chances of an article getting caught in the channel and jamming the entire packaging procedure.

Referring again to FIGS. 3 and 4, the bottle 24 enters the first end 17 of the article-rotating apparatus 10. The cross-sectional area of the channel 12A roughly approximates the perimeter of the article to be rotated. As seen in FIG. 3, a generally rectangularly shaped channel 12A can accommodate irregularly shaped and various sized articles.

The guides 13A communicate with the inner surface 16 of the tubular member to define channel 12A. The guides 13A engage and deflect the article as the article traverses the length of channel 12A, thereby rotating the article the desired amount. As seen in FIG. 4, the cross-sectional view of the article-rotating apparatus 10, the guides 13A have deflected the bottle 24 approximately 135° from the originally standing position it was in when delivered to the first end 17 of the tubular member 19. As can be seen in FIG. 4, as the bottle continues to travel towards the second end 18 of the tubular member 19, the guides 13A continuously deflect the bottle in a clockwise direction until the bottle emerges from the second end 18 in the desired orientation.

Any amount of rotation that is required during the packaging process can be attained using the subject invention. The primary factor in determining the amount of rotation imparted to the article is the arc of rotation of the helically-shaped channel 12 with respect to its longitudinal axis. However, the length of the channel affects the amount and the speed of rotation also. For example, a typical packaging process may require that an article be rotated 180° (i.e., the article is inverted) so that the bottom of the article is accessible (e.g., to be stamped with a code). This may be accomplished using a 24" tubular member and a helical channel 12 having a 180° arc of rotation. However, the same 180° arc of rotation may be accomplished more quickly by decreasing the length of the tubular member 19 while still utilizing a channel having a 180° arc of rotation (i.e., the channel is designed with a tighter spiral). Similarly, the speed of rotation of the article may be decreased by increasing the length of the tubular member 19 (correspondingly extending the length of the channel 12 and guides 13), while keeping the 180° arc of rotation.

In a related example, a 24" long tubular member and a channel having an arc of rotation of 90° will rotate the article from its upright position to its side. As shown above, many options and a great deal of flexibility may be achieved by changing the dimensions of the guides 13 of the article-rotating apparatus 10.

The surfaces of the guides 13 usually communicate with at least a portion of the interior surface 16 of the tubular member to engage and angularly-deflect the article as the article traverses the length of the channel 12, thereby turning the article. Referring again to FIGS. 4 and 5, it should be noted that the interior surface of the guides 13A (i.e., the surface that engages and deflects the article) are preferably manufactured with a slight bow or convex shape. This bowed shape is particularly useful when rotating box-shaped articles 25 having eight corners. This structural feature provides helical clearance which takes into account the depth of the article such as a box being turned as well as its profile. The amount of helical clearance required will vary from article to article and will depend upon the dimensions of the article. In the absence of sufficient helical clearance the article may become jammed in the channel.

Figure 5:
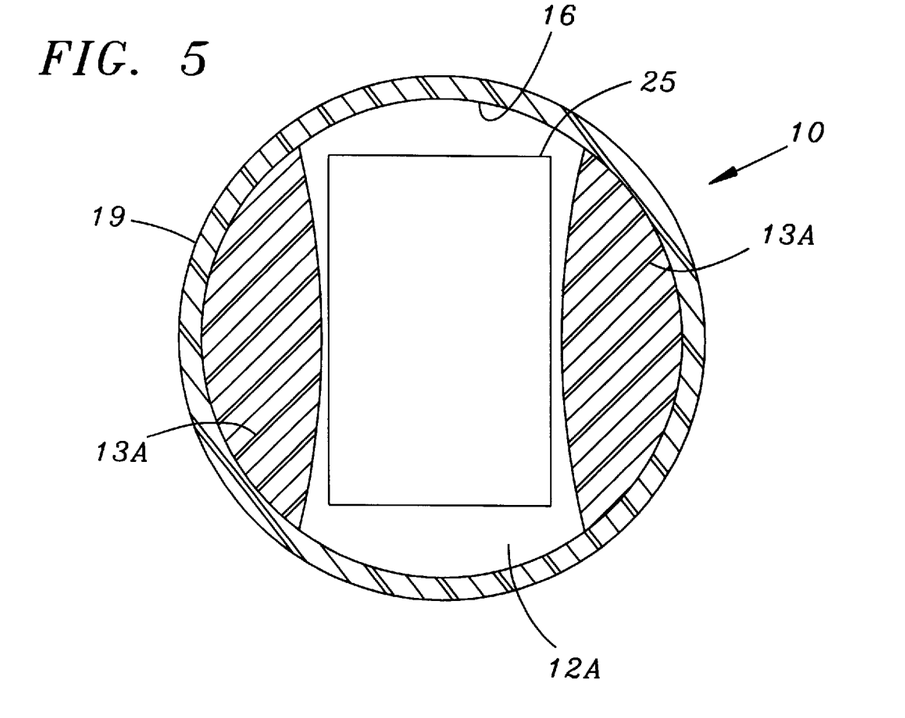
FIG. 5 is a cross-sectional view of the article-rotating apparatus shown in FIG. 1 taken along line 4—4 and including a box.

As shown in FIG. 5, the bowed portion of the guides primarily engage the article. This structural feature reduces the likelihood that the corners of a box-shaped article 25 will grab the guides 13A, thereby jamming the article within the channel 12A. Other guide shapes having one or more protruding portions (e.g., frustoconical, pyramidal, etc.) can work as effectively as the bowed shape depending on the article to be rotated.

Figure 6:
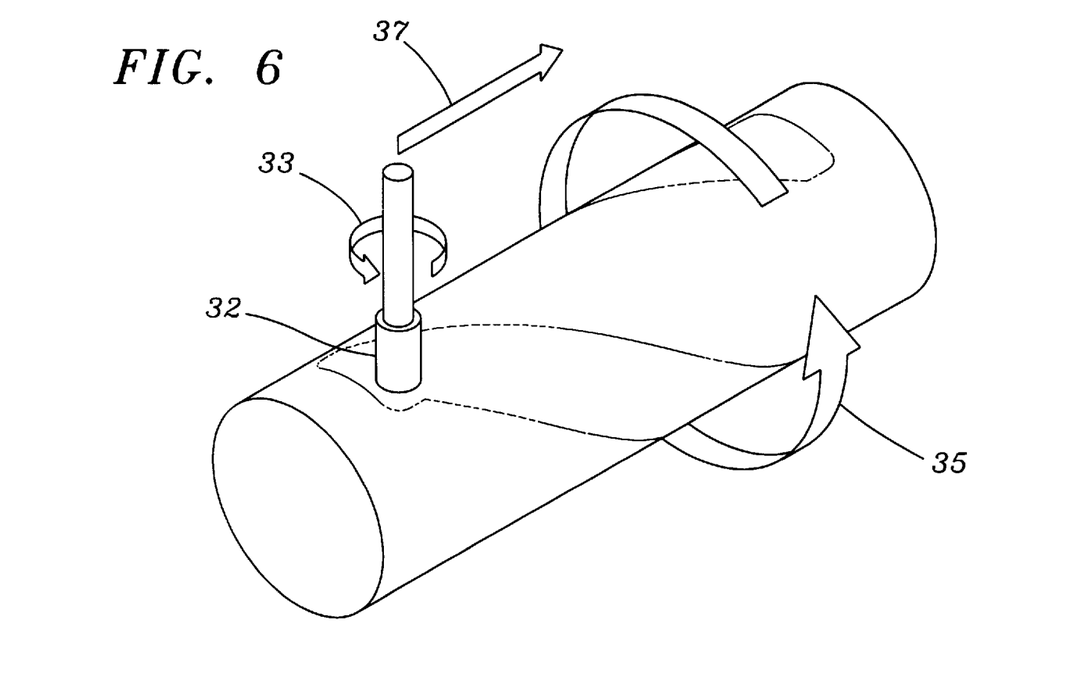
FIG. 6 illustrates a machining step in the method of manufacturing the subject static article-turning apparatus.
Figure 7:
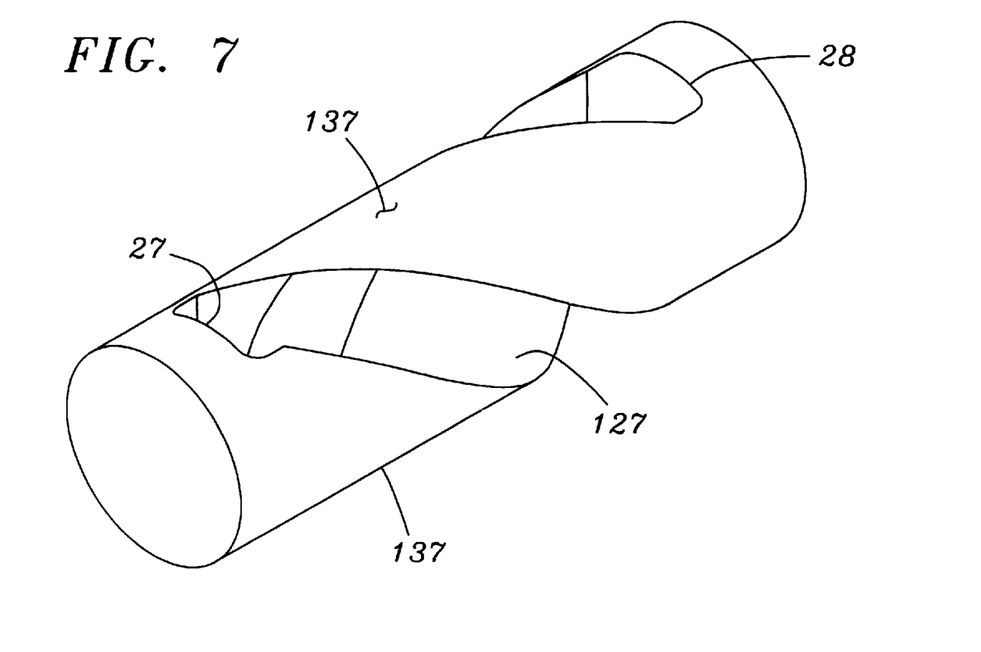
FIG. 7 is a perspective view of a machined cylindrical member after the machining step illustrated in FIG. 6.

With reference to FIGS. 6 and 7, a method of making the embodiment of the subject article-rotating apparatus shown in FIG. 1 will now be described. The guides 13A are manufactured from a solid cylindrical member 31, that has a diameter slightly less than the diameter of the tubular member 19. The cylindrical member 31 is machined by a milling machine having bit 32. The bit 32 is positioned at a point 27 short of a first end 17A of the cylindrical member 31. The milling machine spins the bit 32 in a direction indicated by arrow 33. An initial hole is drilled completely through the diameter of the cylindrical member 31 at point 27.

The cylindrical member 31 is rotated (as indicated by arrow 35) about its longitudinal axis and the bit 32 is simultaneously moved linearly in the longitudinal direction with respect to the cylindrical member as indicated by arrow 37. The rotation of the cylindrical member 31 and the linear movement of the bit 32 in the longitudinal direction is stopped simultaneously at a point 28 short of the second end 18A of the cylindrical member.

In a similar manner, the surface slot 26 of the embodiment shown in FIG. 2 may be machined into a cylinder which eventually forms the guide 13B.

As illustrated in FIG. 7, the machined cylindrical member 31 has a helical slot 12Z defined by the periphery portions 13Z of the machined cylinder and somewhat resembles a barber's pole. Two cap portions 39 bookend the helical slot 12Z providing overall structural support to the machined cylinder 31 and, specifically, rigidity to the periphery portions 13Z.

The linear speed of the bit along direction 37 and the axial rotation speed 35 of the cylinder determine the arc of rotation of the finished article-turning device 10. The periphery portions 13Z may be cut to a specific length which also affects the desired amount of rotation to be imparted to the article by the finished article-rotating apparatus 10.

It will become apparent that the distance between drill points 27 and 28 must be at least as long, and preferably longer, than the desired length of the tubular member 19 of the finished article-rotating apparatus 10. Accordingly, the length of the unmachined cylinder 31 must be greater than the length of the tubular member 19 of the finished article-rotating apparatus 10.

Figure 8A:
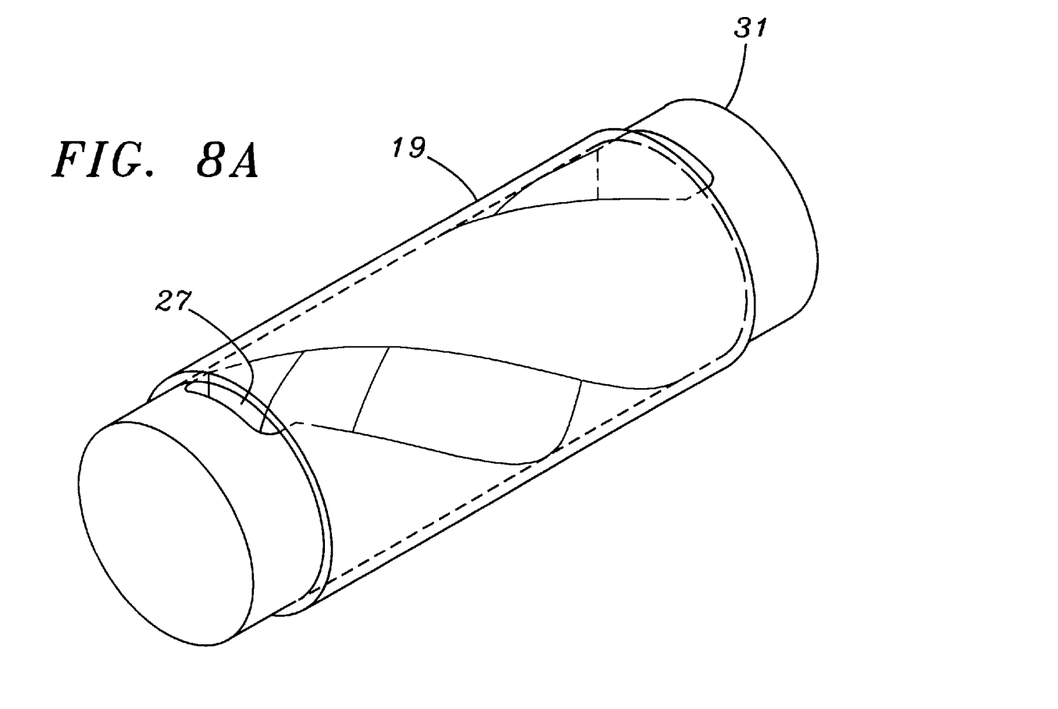
FIG. 8A illustrates a positioning step in the method of manufacturing the subject static article-turning apparatus.
Figure 8B:
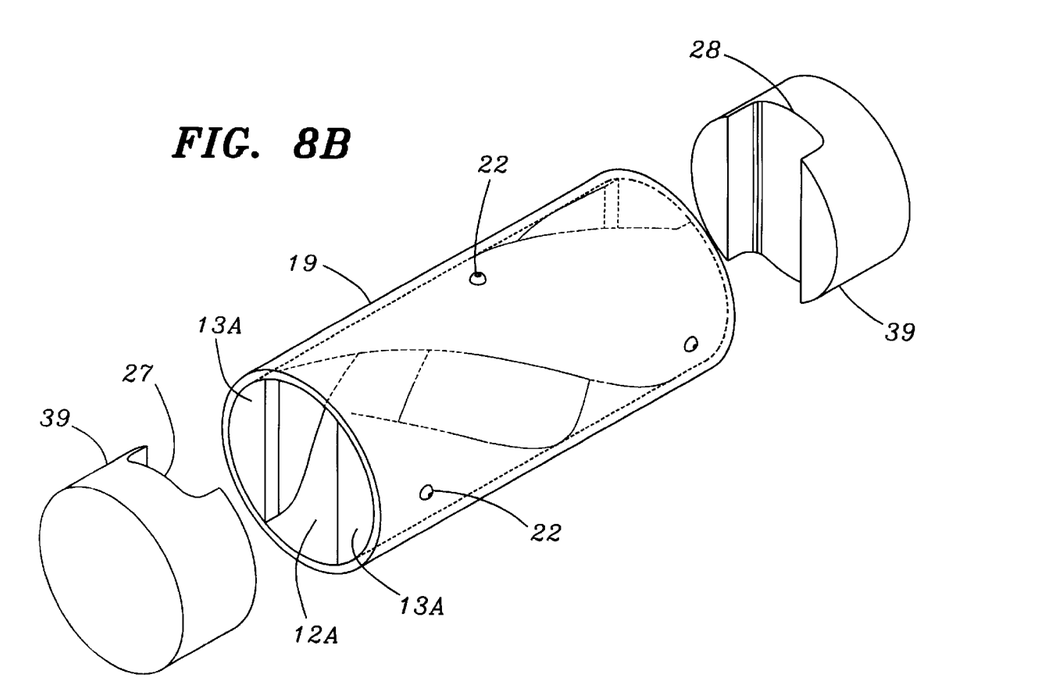
FIG. 8B illustrates a cutting step in the method of manufacturing the subject static article-turning apparatus.

The machined cylindrical member 31A is then slid into the tubular member 19 as shown in FIGS. 8A and 8B. The periphery portions 13Z are attached to the tubular member 19 preferably using screws 22. The next step is to remove at least the caps 39—and possibly an incidental portion of the tubular member 19 leaving the desired length to the article-rotating apparatus. Note that since the linear distance between starting point 27 and ending point 28 is at least as long as the desired length of the tubular member 19, the caps 39 are completely removed, forming guides 13A and an unobstructed, continuous channel 12A. The guides 13A are now supported by the tubular member 19.

An important advantage of such a method of manufacturing the subject article-rotating apparatus is that no manual labor is needed to precisely align the guides and to ensure a uniform width of channel 12A. The caps 39 maintain the relative orientation of the guides during machining and ensure the proper positioning for attachement to the tubular member. The caps are not removed until the guides 13A are securely attached to the tubular member 19, thereby preventing any relative movement between the two guides. Only a simple linear measurement of the overall length before cutting off the caps is needed during the entire method of manufacturing the subject apparatus.

Figure 9:
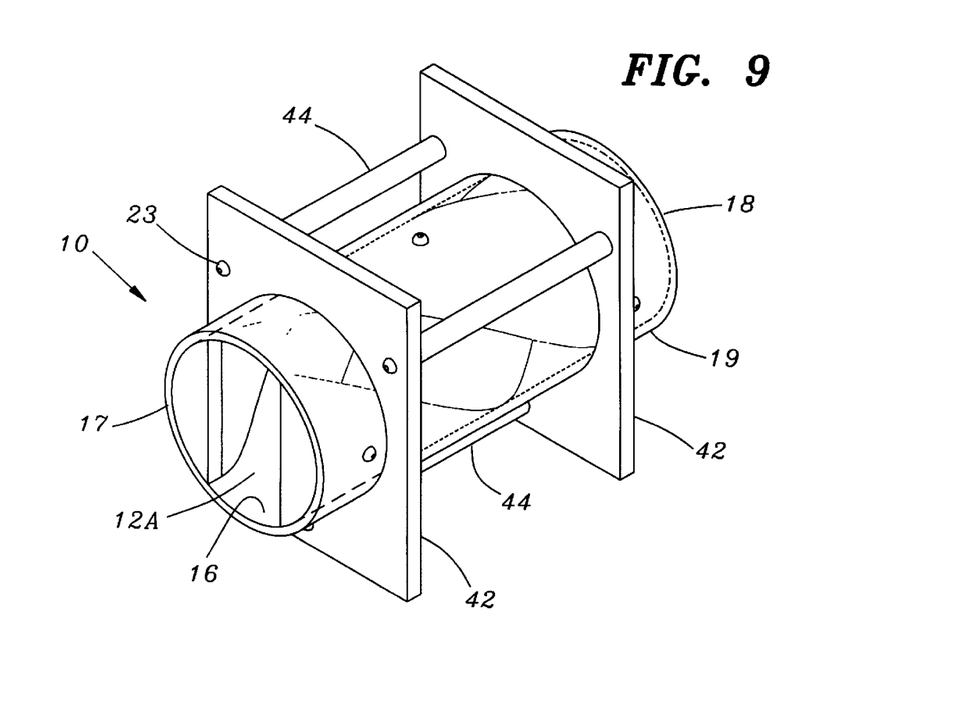
FIG. 9 is a perspective view of the article-turning apparatus shown in FIG. 1 with an accompanying carry/support structure.

Referring now to FIG. 9, a handling attachment 40 may be constructed from one or more panels 42 and a plurality of spacers 44. The spacers 44 may be secured to the panels 42 using screws 23. The handling attachment 40 allows the article-rotating apparatus 10 to be picked up and moved more easily. In addition, securing means (not shown) may be used with the handling attachment 40 to secure the apparatus 10 in a specific location with respect to the packaging machinery. This ensures that the article-rotating apparatus 10 stays in proper alignment when articles are delivered to its first or receiving end 17 and for delivering the article to the next step in the packaging procedure via exit end 18. The securing means may, for example, consist of straps or clamps to hold down the apparatus 10, or apertures in the panels 42 that communicate with brackets for bolting the apparatus to a stand or another object.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. An apparatus for rotating an article, comprising:
   a) a tubularly-shaped member defined by a diameter; and
   b) means for rotating the article as the article traverses said tubularly-shaped member, wherein said means for rotating includes a pair of opposing sidewalls that extend substantially across the diameter of said tubularly-shaped member thus forming a smooth and generally continuous channel, and attaches to an interior surface of said tubularly-shaped member.

2. The apparatus of claim 1, wherein the interior surface of said tubularly-shaped member is generally concave in shape and said means for rotating comprises a generally convex exterior surface for mating engagement with at least a portion of the interior surface of said tubularly-shaped member.

3. The apparatus of claim 1, wherein said channel is generally helical in shape.

4. The apparatus of claim 3, wherein said channel has a substantially rectangular cross-section.

5. The apparatus of claim 1, wherein the pair of opposing sidewalls are diametrically-opposed.

6. The apparatus of claim 1, wherein the pair of opposing sidewalls are each helically shaped.

7. The apparatus of claim 1, wherein the pair of opposing sidewalls are defined by a first length and said tubularly-shaped member is defined by a second length generally equal to the first length.

8. The apparatus of claim 1, wherein said tubularly-shaped member is comprised of acrylic.

9. The apparatus of claim 1, wherein said means for rotating is comprised of an ultrahigh molecular weight polyethylene.

10. The apparatus of claim 1, wherein said means for rotating is attached with screws.

11. A static article-turning apparatus, comprising:
    a) a tubularly-shaped member; and
    b) a guide attached to an interior surface of said tubularly-shaped member, said guide communicating with at least a portion of the interior surface of said tubularly-shaped member for defining a channel therethrough, said channel having a pair of opposing sidewalls that extend substantially across a cylindrical cross-section of said tubularly-shaped member and form a smooth and generally continuous inner surface, wherein portions of said guide and the interior surface of said tubularly-shaped member engage and angularly-deflect the article as the article traverses said channel, thereby turning the article.

12. A static article-turning apparatus, comprising:
    a) an outer tube; and
    b) an inner tube attached to an interior surface of said outer tube, said inner tube having a helically-shaped radial opening formed therein, said helically-shaped radial opening having smooth and generally continuous sidewalls, the smooth and generally continuous sidewalls forming a channel for angularly-deflecting the article as the article traverses said channel, thereby turning the article.

13. The apparatus of claim 12, wherein the interior surface of said outer tube is substantially concave in shape and said inner tube has a generally convex exterior surface for mating engagement with at least a portion of the interior surface of said outer tube.

14. The apparatus of claim 12, wherein the smooth and generally continuous sidewalls and portions of the interior surface of said outer tube form the channel.

15. The apparatus of claim 12, wherein said outer tube is defined by a length and said inner tube is defined by a degree of arc and the article is angularly-deflected in proportion to the length and the degree of arc.

16. The apparatus of claim 12, wherein said helically-shaped radial opening traverses said inner tube to form a pair of guides in a diametrically opposed relation thereby forming a double helix.

17. A static article-turning apparatus, comprising:
    a) a tube; and
    b) a cylinder having a helically-shaped radial opening therethrough so as to
    present a pair of smooth and generally continuous inner sidewall surfaces for the article to contact, said cylinder having a diameter slightly less than a diameter of an interior opening of said tube and attached to an interior surface of said tube.

18. The apparatus of claim 17, wherein said cylinder is a hollow tube.

19. The apparatus of claim 17, wherein said cylinder is solid.

20. The apparatus of claim 17, wherein the helically-shaped radial opening extends completely through said cylinder.

21. The apparatus of claim 17, wherein the helically-shaped radial opening only extends partially through said opening.

22. The apparatus of claim 17, wherein said tube comprises exactly one piece.

23. The apparatus of claim 17, wherein said tube comprises an acrylic material.

24. The apparatus of claim 17, wherein said cylinder comprises an ultrahigh molecular weight polyethylene.

* * * * *